United States Patent
Lee et al.

(10) Patent No.: US 7,729,304 B2
(45) Date of Patent: Jun. 1, 2010

(54) POINT-TO-MULTIPOINT SERVICE MEDIUM ACCESS CONTROL ENTITY STRUCTURE

(75) Inventors: Young Dae Lee, Kyoungki-do (KR); Sung Duck Chun, Anyang (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 528 days.

(21) Appl. No.: 11/150,324

(22) Filed: Jun. 10, 2005

(65) Prior Publication Data
US 2005/0286472 A1    Dec. 29, 2005

(30) Foreign Application Priority Data
Jun. 14, 2004    (KR)    ........................ 10-2004-0043755

(51) Int. Cl.
*H04W 4/00*    (2009.01)
(52) U.S. Cl. .................................... 370/328
(58) Field of Classification Search ................. 370/312, 370/328–329, 469
See application file for complete search history.

(56) References Cited

U.S. PATENT DOCUMENTS

| 6,751,227 | B1 * | 6/2004 | Ahmavaara et al. ......... 370/410 |
| 2003/0207696 | A1 | 11/2003 | Willenegger et al. | |
| 2004/0085926 | A1 * | 5/2004 | Hwang et al. .............. 370/328 |

FOREIGN PATENT DOCUMENTS

| EP | 1 353 523 A1 | 10/2003 |
| KR | 10-2004-0026153 A | 3/2004 |
| WO | 2003015431 | 2/2003 |
| WO | WO 03/015439 A1 | 2/2003 |
| WO | 2004002021 | 12/2003 |
| WO | 2004028041 | 4/2004 |

OTHER PUBLICATIONS

3GPP TS 25.346 v6.0.0, Introduction of Multimedia Broadcast Multicast Service (MBMS) in the Radio Access Network (RAN), Mar. 2004, Release 6.*
CR001 to 3GPP TS 25.346 v6.0.0, Updates based on the MBMS ad-hoc, Apr. 2004, Release 6.*

(Continued)

*Primary Examiner*—Duc Nguyen
*Assistant Examiner*—Zhiyu Lu
(74) *Attorney, Agent, or Firm*—Lee, Hong, Degerman, Kang & Waimey

(57) ABSTRACT

The present invention relates to combining point-to-multipoint service data in a mobile terminal of a wireless communication system. A mobile terminal receiving MBMS service data of a current cell in a MAC entity while concurrently receiving the same MBMS service data from a neighboring cell in a MAC entity discards any received data not related to MBMS. Accordingly, any unnecessary operation of the terminal in simultaneously receiving the MBMS service from different cells is minimized. Thus, the mobile terminal effectively receives the MBMS service.

18 Claims, 12 Drawing Sheets

OTHER PUBLICATIONS

Nokia, "MBMS Protocol Stack," 3GPP TSG RAN WG2 Meeting #39, R2-032399, XP050124703, Nov. 17, 2003.

Samsung, "Selective Combining for MBMS," 3GPP TSG-RAN WG2 #40, R2-040074, XP050125086, Jan. 12, 2004.

3GPP, 3rd Generation Partnership Project; Technical Specification Group Radio Access Network; Introduction of the Multimedia Broadcast Multicast Service (MBMS) in the Radio Access Network (RAN); Stage 2 (Release 6), 3GPP TS 25.346 V6.0.0, Mar. 2004, XP050125704.

LG Electronics Inc., "Revised CR to 25.321 for MAC Model with MSCH," TSG-RAN Working Group 2 #45, R2-042559, XP050127088, Nov. 15, 2003.

Siemens, "Changes to the Description of RLC for Selective Combining," 3GPP TSG-RAN Working Group 2 Ad-hoc, R2-040798, XP050141636, Apr. 20, 2004.

LG Electronics Inc., "Discussion on MAC Model for MBMS," TSG-RAN WG2 Release 6 Adhoc, R2-041343, XP050141724, Jun. 21, 2004.

* cited by examiner

POINT-TO-MULTIPOINT SERVICE MEDIUM ACCESS CONTROL ENTITY STRUCTURE

CROSS-REFERENCE TO RELATED APPLICATIONS

Pursuant to 35 U.S.C. §119(a), this application claims the benefit of earlier filing date and right of priority to Korean Application No. 2004-0043755, filed on Jun. 14, 2004, the contents of which is hereby incorporated by reference herein in its entirety.

FIELD OF THE INVENTION

The present invention relates to a multimedia broadcast/multicast service (MBMS) of a wireless communication system and, more particularly, to combining an MBMS in a mobile terminal using a medium access control (MAC) entity structure.

BACKGROUND OF THE INVENTION

A universal mobile telecommunications system (UMTS) is a third-generation mobile communications system evolving from a global system for mobile communications system (GSM), which is the European standard. The UMTS is aimed at providing enhanced mobile communications services based on the GSM core network and wideband code-division multiple-access (W-CDMA) technologies.

In December 1998, ETSI of Europe, ARIB/TTC of Japan, T1 of the United States, and TTA of Korea formed a Third Generation Partnership Project (3GPP) for creating detailed specifications of the UMTS technology. Within the 3GPP, in order to achieve rapid and efficient technical development of the UMTS, five technical specification groups (TSG) have been created for determining the specification of the UMTS by considering the independent nature of the network elements and their operations.

Each TSG develops, approves, and manages the specification within a related region. Among these groups, the radio access network (RAN) group (TSG-RAN) develops the specifications for the functions, requirements, and interface of the UMTS terrestrial radio access network (UTRAN), which is a new radio access network for supporting W-CDMA access technology in the UMTS.

A related art UMTS network structure 1 is illustrated in FIG. 1. As shown, a mobile terminal, or user equipment (UE) 10 is connected to a core network (CN) 200 through a UMTS terrestrial radio access network (UTRAN) 100. The UTRAN 100 configures, maintains and manages a radio access bearer for communications between the UE 10 and the core network 200 to meet end-to-end quality of service requirements.

The UTRAN 100 includes a plurality of radio network subsystems (RNS) 110, 120, each of which comprises one radio network controller (RNC) 111 for a plurality base stations, or Node Bs 112. The RNC 111 connected to a given base station 112 is the controlling RNC for allocating and managing the common resources provided for any number of UEs 10 operating in one cell. One or more cells exist in one Node B. The controlling RNC 111 controls traffic load, cell congestion, and the acceptance of new radio links. Each Node B 112 may receive an uplink signal from a UE 10 and may transmit downlink signals to the UE 10. Each Node B 112 serves as an access point enabling a UE 10 to connect to the UTRAN 100, while an RNC 111 serves as an access point for connecting the corresponding Node Bs to the core network 200.

Among the radio network subsystems 110, 120 of the UTRAN 100, the serving RNC 111 is the RNC managing dedicated radio resources for the provision of services to a specific UE 10 and is the access point to the core network 200 for data transfer to the specific UE. All other RNCs 111 connected to the UE 10 are drift RNCs, such that there is only one serving RNC connecting the UE to the core network 200 via the UTRAN 100. The drift RNCs 111 facilitate the routing of user data and allocate codes as common resources.

The interface between the UE 10 and the UTRAN 100 is realized through a radio interface protocol established in accordance with radio access network specifications describing a physical layer (L1), a data link layer (L2) and a network layer (L3) described in, for example, 3GPP specifications. These layers are based on the lower three layers of an open system interconnection (OSI) model that is well known in communications systems.

A related art architecture of the radio interface protocol is illustrated in FIG. 2. As shown, the radio interface protocol is divided horizontally into a physical layer, a data link layer, and a network layer, and is divided vertically into a user plane for carrying data traffic such as voice signals and Internet protocol packet transmissions, and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

The MAC layer of the second layer provides a service to an upper layer, namely, an RLC (Radio Link Control) layer, via a logical channel. The RLC layer supports reliable data transmissions, and performs a segmentation and concatenation function on a plurality of RLC service data units (RLC SDUs) delivered from an upper layer.

A radio resource control (RRC) layer located in a lowermost portion of the L3 layer is defined only in the control plane. The RRC manages the control of logical channels, transport channels, and physical channels with respect to establishment, reconfiguration and release of radio bearers (RBs). A radio bearer service refers to a service that the second layer (L2) provides for data transmission between the terminal and the UTRAN. In general, the establishment of a radio bearer refers to defining the protocol layers and the channel characteristics of the channels required for providing a specific service, as well as respectively setting substantial parameters and operation methods.

An MBMS is implemented in the UMTS system as follows. The MBMS refers to a method for providing a streaming or background service to multiple terminals by using a downlink-exclusive MBMS bearer service. One MBMS service is made up of one or more sessions, and MBMS data is transmitted to multiple terminals through the MBMS bearer service only when a session is ongoing.

The UTRAN 100 provides the MBMS bearer service to terminals using an RB. Two types of RBs used by the UTRAN 100 are a point-to-point RB and a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel) or a physical channel SCCPCH (Secondary Common Control Physical Channel).

The point-to-multipoint RB is a unidirectional downlink RB, including a logical channel MTCH (MBMS Traffic Channel), a transport channel FACH (Forward Access Channel) and the physical channel SCCPCH as shown in FIG. 3. The MTCH is configured for every MBMS service provided in one cell and used to transmit user plane data of a specific MBMS service to multiple terminals.

FIG. 3 illustrates a channel mapping structure of the point-to-multipoint RB. A logical channel MCCH, which is a point-to-multipoint downlink channel, transmits MBMS-related control information. The MCCH is mapped to the transport channel FACH. The FACH is mapped to the physical channel SCCPCH. Only one MCCH exists in one cell.

FIG. 4 illustrates a structure of MAC layers of a mobile terminal and a UTRAN that handle an MBMS. A MAC-c/sh/m sublayer (hereinafter referred to as "MAC-c/sh/m"), as shown in FIG. 4, performs three types of functions.

First, the MAC-c/sh/m manages transport channels, such as a PCH (Paging Channel), the FACH and a RACH (Random Access Channel), to which common logical channels, such as a CCCH (Common Control Channel), a CTCH (Common Traffic Channel), a BCCH (Broadcast Control Channel) and a PCCH (Paging Control Channel) that every terminal in a cell region can receive are mapped. Second, the MAC-c/sh/m manages a transport channel DSCH (Downlink Shared Channel). Third, the MAC-c/sh/m manages the transport channel FACH to which the MBMS-exclusive logical channels MCCH and MTCH are mapped.

The MAC-c/sh/m of the UTRAN is located in an RNC. One MAC-c/sh/m exists per cell region. On the terminal side, one MAC-c/sh/m exists per terminal. A MAC-d sublayer ("MAC-d"), as shown in FIG. 4, manages dedicated logical channels DTCH and DCCH.

Referring to FIG. 4, an RRC layer respectively controls a MAC entity, such as the MAC-c/sh/m and the MAC-d through a MAC control SAP (Service Access Point). The RRC layer and the MAC layer exchange one or more primitives through the MAC control SAP. Primitives exchanged through the MAC control SAP include a primitive used for the RRC layer to control the MAC layer and a primitive used for the MAC layer to report to the RRC layer. Each primitive includes a parameter to be used by the RRC layer and the MAC layer.

FIG. 5 illustrates a radio protocol architecture in accordance with a related art MBMS selective combining method. As shown in FIG. 5, when receiving the same MBMS service from a plurality of cell regions, a terminal receives the same MBMS data through a plurality of physical channels SCCPCHs and combines the received MBMS data. In this respect, the MBMS data may be combined using methods such as selective combining and soft combining.

In soft combining, a physical layer of a receiving side, preferably the terminal, processes data received by one MAC-c/sh/m entity by combining respectively different physical channels.

In selective combining, as shown in FIG. 5, the terminal comprises a plurality of MAC-c/sh/m entities corresponding to each cell region, wherein each MAC-c/sh/m entity processes received MBMS data. The processed MBMS data of each MAC-c/sh/m entity is then combined in the RLC layer. Accordingly, to perform selective combining, the terminal and the UTRAN must have a plurality of MAC-c/sh/m entities corresponding to each cell region.

Assuming that a cell region ("cell") in which the terminal is positioned is a current cell (cell #1) and a cell adjacent to the current cell is a neighboring cell (cell #2), the related art selective combining method makes the MAC-c/sh/m of the terminal for the cell #2, specifically, MAC-c/sh/m #2, receive a common channel other than the MTCH.

However, it has been realized that the reception of a common channel other than the MTCH from the neighboring cell and not from the current cell, namely, the reception of non-MBMS data from the neighboring cell, is practically an unnecessary operation. Such operation degrades efficiency of the overall communications system and wastes communication resources.

SUMMARY OF THE INVENTION

The present invention is directed to combining point-to-multipoint service data in a mobile terminal of a wireless communication system using a medium access control entity structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for combining point-to-multipoint service data in a mobile terminal of a wireless communication system, the method comprising receiving and processing point-to-multipoint service data of a first cell in a first medium access control entity capable of processing a first point-to-multipoint channel and at least one of a common channel and a shared channel, concurrently receiving and processing the same point-to-multipoint service data from a second cell in a second medium access control entity capable of processing only a second point-to-multipoint channel providing the processed point-to-multipoint service data of the first cell from the first medium access control entity to a radio link controller, providing the processed point-to-multipoint service data of the second cell from the second medium access control entity to the radio link controller, and combining the processed point-to-multipoint service data of the first cell and the processed point-to-multipoint service data of the second cell in the radio link controller.

Preferably, the first medium access control entity is a MAC-c/sh/m. The second medium access control entity is a MAC-m.

In one aspect, the point-to-multipoint service data from the second cell is transmitted from a medium access control entity of a network, capable of processing the second point-to-multipoint channel and at least one of a network common channel and a network shared channel, to the second medium access control entity of the mobile terminal capable of processing only the second point-to-multipoint channel.

Preferably, the first medium access control entity capable of processing the first point-to-multipoint channel and the at least one of a common channel and a shared channel is operatively connected with a third medium access control entity capable of processing a dedicated channel, and the second medium access control entity capable of processing only the second point-to-multipoint channel is not operatively connected with the third medium access control entity capable of processing a dedicated channel.

In another aspect, the third medium access control entity is a MAC-d. The first medium access control entity is capable of supporting an uplink channel and a downlink channel. The second medium access control entity is capable of supporting a downlink channel. The first medium access control entity is capable of processing a mobile terminal I.D. The second medium access control entity is not capable of processing a mobile terminal I.D.

In accordance with another embodiment of the present invention, a method for combining point-to-multipoint service data in a mobile terminal of a wireless communication system comprises receiving and processing point-to-multipoint service data of a first cell in a first medium access control entity capable of processing at least one of a common channel and a shared channel, receiving and processing the point-to-multipoint service data of the first cell in a second medium access control entity capable of processing only a first point-to-multipoint channel, concurrently receiving and processing the same point-to-multipoint service data from a second cell in a third medium access control entity capable of processing only a second point-to-multipoint channel, providing the processed point-to-multipoint service data of the first cell from the second medium access control entity to a radio link controller, providing the processed point-to-multipoint service data of the second cell from the third medium access control entity to the radio link controller, and combining the processed point-to-multipoint service data of the first cell and the processed point-to-multipoint service data of the second cell in the radio link controller.

Preferably, the first medium access control entity is a MAC-c/sh, the second medium access control entity is a MAC-m and the third medium access control entity is a MAC-m.

In one aspect, the point-to-multipoint service data from the second cell is transmitted from a medium access control entity of a network, capable of processing the second point-to-multipoint channel and at least one of a network common channel and a network shared channel, to the third medium access control entity of the mobile terminal capable of processing only the second point-to-multipoint channel.

Preferably, the first medium access control entity capable of processing the first point-to-multipoint channel and the at least one of a common channel and a shared channel is operatively connected with a fourth medium access control entity capable of processing a dedicated channel, and the second medium access control entity and the third medium access control entity are not operatively connected with the fourth medium access control entity capable of processing a dedicated channel.

In another aspect, the fourth medium access control entity is a MAC-d. The first medium access control entity is capable of supporting an uplink channel and a downlink channel. The second medium access control entity and the third medium access control entity are capable of supporting a downlink channel. The first medium access control entity is capable of processing a mobile terminal I.D. The second medium access control entity and the third medium access control entity are not capable of processing a mobile terminal I.D.

In accordance with another embodiment of the present invention, a method for combining point-to-multipoint service data in a mobile terminal of a wireless communication system comprises receiving and processing point-to-multipoint service data of a first cell in a first medium access control entity capable of processing a first point-to-multipoint channel and at least one of a common channel and a shared channel, concurrently receiving and processing the same point-to-multipoint service data from a second cell in a second medium access control entity capable of processing a second point-to-multipoint channel and at least one of a common channel and a shared channel, receiving in the second medium access control entity a limitation command for limiting processing to the second point-to-multipoint channel, processing the point-to-multipoint service data from the second cell according to the limitation command, providing the processed point-to-multipoint service data of the first cell from the first medium access control entity to a radio link controller, providing the processed point-to-multipoint service data of the second cell from the second medium access control entity to the radio link controller, and combining the processed point-to-multipoint service data of the first cell and the processed point-to-multipoint service data of the second cell in the radio link controller.

Preferably, the first medium access control entity is a MAC-c/sh/m. The second medium access control entity is a MAC-c/sh/m.

In one aspect, the point-to-multipoint service data from the second cell is transmitted from a medium access control entity of a network, capable of processing the second point-to-multipoint channel and at least one of a network common channel and a network shared channel, to the second medium access control entity of the mobile terminal capable of processing the second point-to-multipoint channel and at least one of the common channel and the shared channel.

Preferably, the first medium access control entity capable of processing the first point-to-multipoint channel and the at least one of a common channel and a shared channel is operatively connected with a third medium access control entity capable of processing a dedicated channel, and the second medium access control entity capable of processing the second point-to-multipoint channel and the at least one of a common channel and a shared channel is not operatively connected with the third medium access control entity capable of processing a dedicated channel.

In another aspect, the third medium access control entity is a MAC-d. The first medium access control entity is capable of supporting an uplink channel and a downlink channel. The second medium access control entity is capable of supporting a downlink channel. The first medium access control entity is capable of processing a mobile terminal I.D. The second medium access control entity is not capable of processing a mobile terminal I.D.

In accordance with another embodiment of the present invention, a method for combining point-to-multipoint service data in a mobile terminal of a wireless communication system comprises receiving and processing point-to-multipoint service data of a first cell in a medium access control entity capable of processing a point-to-multipoint channel and at least one of a common channel and a shared channel, concurrently receiving and processing the same point-to-multipoint service data from a second cell in the medium access control entity, receiving in the medium access control entity a limitation command for limiting processing to the point-to-multipoint channel with respect to the point-to-multipoint service data of the second cell, processing the point-to-multipoint service data from the second cell according to the limitation command, providing the processed point-to-multipoint service data of the first cell to a radio link controller, providing the processed point-to-multipoint service data of the second cell to the radio link controller, and combining the processed point-to-multipoint service data of the first cell and the processed point-to-multipoint service data of the second cell in the radio link controller.

Preferably, the medium access control entity is a MAC-c/shim.

In one aspect, the point-to-multipoint service data from the second cell is transmitted from a medium access control entity of a network, capable of processing a point-to-multipoint channel and at least one of a network common channel and a network shared channel, to the medium access control entity of the mobile terminal capable of processing the point-to-multipoint channel and at least one of the common channel and the shared channel.

Preferably, the medium access control entity capable of processing the first point-to-multipoint channel and the at least one of a common channel and a shared channel is operatively connected with a second medium access control entity capable of processing a dedicated channel.

In another aspect, the second medium access control entity is a MAC-d. The medium access control entity is capable of supporting an uplink channel and a downlink channel. The medium access control entity is capable of supporting a downlink channel. The medium access control entity is capable of processing a mobile terminal I.D. The medium access control entity is not capable of processing a mobile terminal I.D.

In accordance with another embodiment of the present invention, a method for transmitting point-to-multipoint service data in a wireless communication system comprises transmitting point-to-multipoint service data of a first cell through a first medium access control entity capable of processing a first point-to-multipoint channel, and concurrently transmitting the same point-to-multipoint service data from a second cell through a second medium access control entity capable of processing a second point-to-multipoint channel. Preferably, the first and second medium access control entities are MAC-m entities.

In accordance with another embodiment of the present invention, a mobile terminal for combining point-to-multipoint service data of a wireless communication system comprises means for receiving and processing point-to-multipoint service data of a first cell in a first medium access control entity capable of processing a first point-to-multipoint channel and at least one of a common channel and a shared channel, means for concurrently receiving and processing the same point-to-multipoint service data from a second cell in a second medium access control entity capable of processing only a second point-to-multipoint channel, means for providing the processed point-to-multipoint service data of the first cell from the first medium access control entity to a radio link controller, means for providing the processed point-to-multipoint service data of the second cell (neighboring cell) from the second medium access control entity to the radio link controller, and means for combining the processed point-to-multipoint service data of the first cell and the processed point-to-multipoint service data of the second cell in the radio link controller.

In accordance with another embodiment of the present invention, a mobile terminal for combining point-to-multipoint service data of a wireless communication system comprises means for receiving and processing point-to-multipoint service data of a first cell in a first medium access control entity capable of processing at least one of a common channel and a shared channel, means for receiving and processing the point-to-multipoint service data of the first cell in a second medium access control entity capable of processing only a first point-to-multipoint channel, means for concurrently receiving and processing the same point-to-multipoint service data from a second cell in a third medium access control entity capable of processing only a second point-to-multipoint channel, means for providing the processed point-to-multipoint service data of the first cell from the second medium access control entity to a radio link controller, means for providing the processed point-to-multipoint service data of the second cell from the third medium access control entity to the radio link controller, and means for combining the processed point-to-multipoint service data of the first cell and the processed point-to-multipoint service data of the second cell in the radio link controller.

In accordance with another embodiment of the present invention, a mobile terminal for combining point-to-multipoint service data of a wireless communication system comprises means for receiving and processing point-to-multipoint service data of a first cell in a first medium access control entity capable of processing a first point-to-multipoint channel and at least one of a common channel and a shared channel, means for concurrently receiving and processing the same point-to-multipoint service data from a second cell in a second medium access control entity capable of processing a second point-to-multipoint channel and at least one of a common channel and a shared channel, means for receiving in the second medium access control entity a limitation command for limiting processing to the second point-to-multipoint channel, means for processing the point-to-multipoint service data from the second cell according to the limitation command, means for providing the processed point-to-multipoint service data of the first cell from the first medium access control entity to a radio link controller, means for providing the processed point-to-multipoint service data of the second cell from the second medium access control entity to the radio link controller, and means for combining the processed point-to-multipoint service data of the first cell and the processed point-to-multipoint service data of the second cell in the radio link controller.

In accordance with another embodiment of the present invention, a mobile terminal for combining point-to-multipoint service data of a wireless communication system comprises means for receiving and processing point-to-multipoint service data of a first cell in a medium access control entity capable of processing a point-to-multipoint channel and at least one of a common channel and a shared channel, means for concurrently receiving and processing the same point-to-multipoint service data from a second cell in the medium access control entity, means for receiving in the medium access control entity a limitation command for limiting processing to the point-to-multipoint channel with respect to the point-to-multipoint service data of the second cell, means for processing the point-to-multipoint service data from the second cell according to the limitation command, means for providing the processed point-to-multipoint service data of the first cell to a radio link controller, means for providing the processed point-to-multipoint service data of the second cell to the radio link controller, and means for combining the processed point-to-multipoint service data of the first cell and the processed point-to-multipoint service data of the second cell in the radio link controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
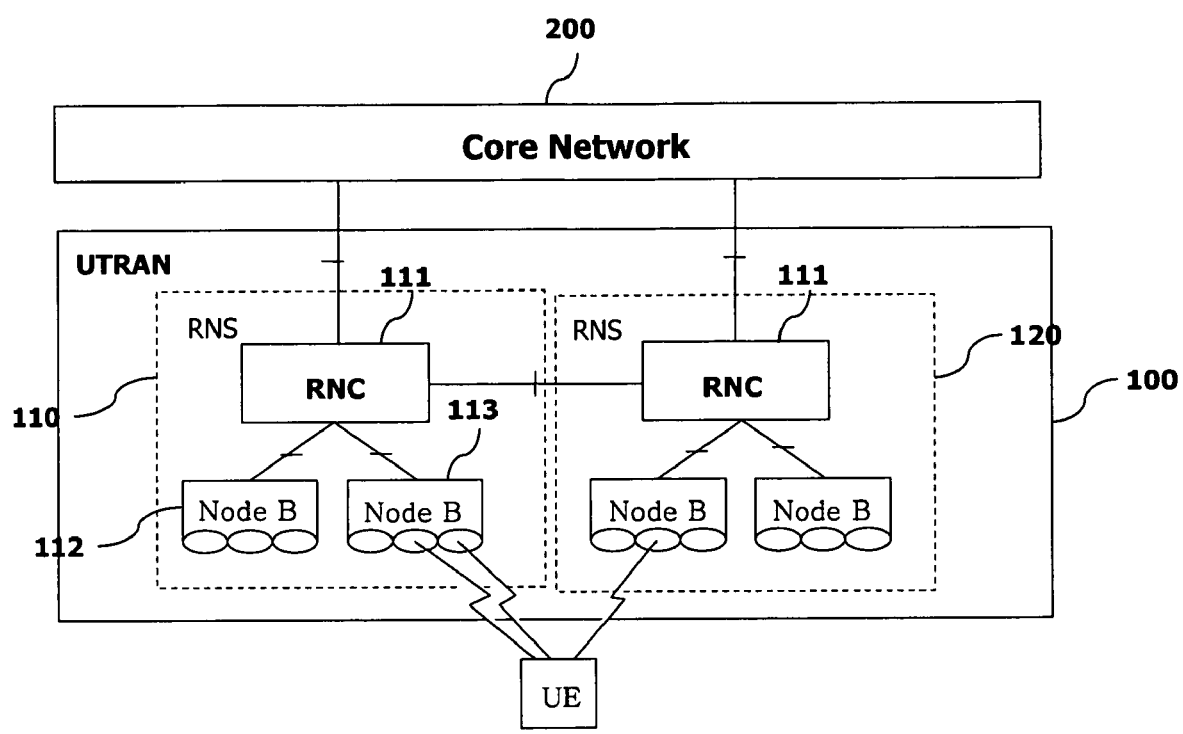
FIG. 1 illustrates a general UMTS network structure.
Figure 2:
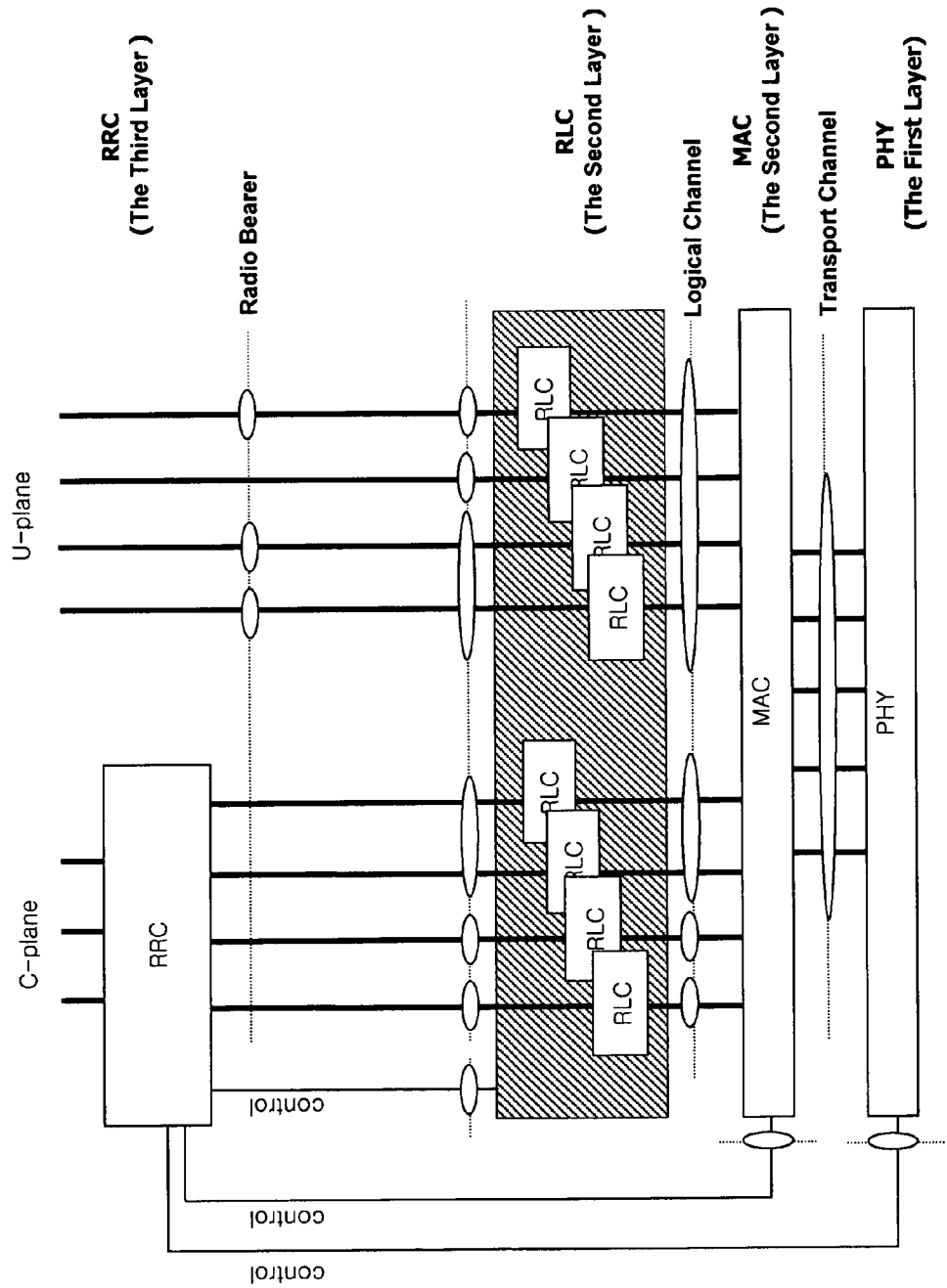
FIG. 2 illustrates a UMTS radio protocol architecture.
Figure 3:
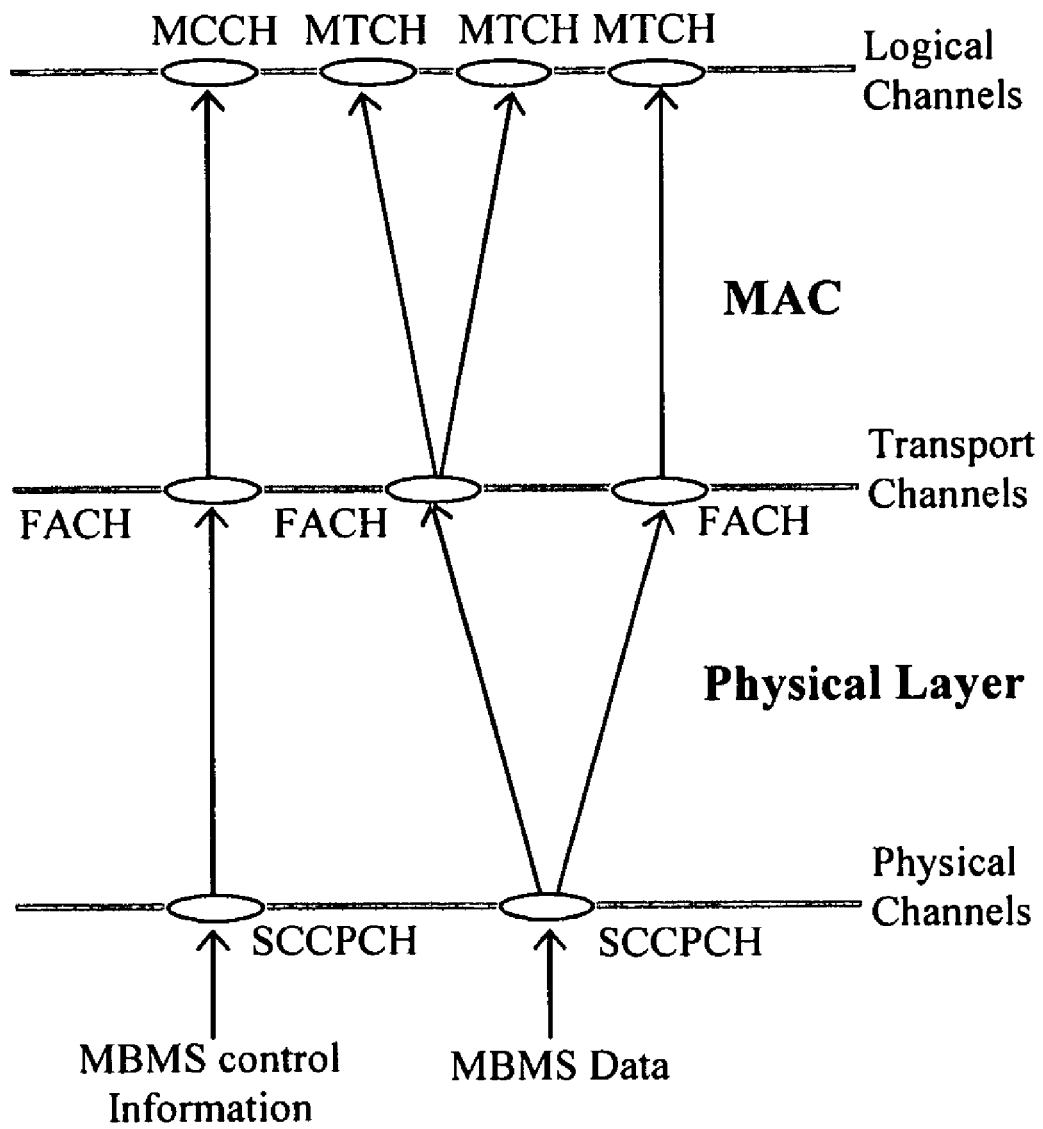
FIG. 3 illustrates related art channel mapping of a terminal with respect to an MBMS.
Figure 4:
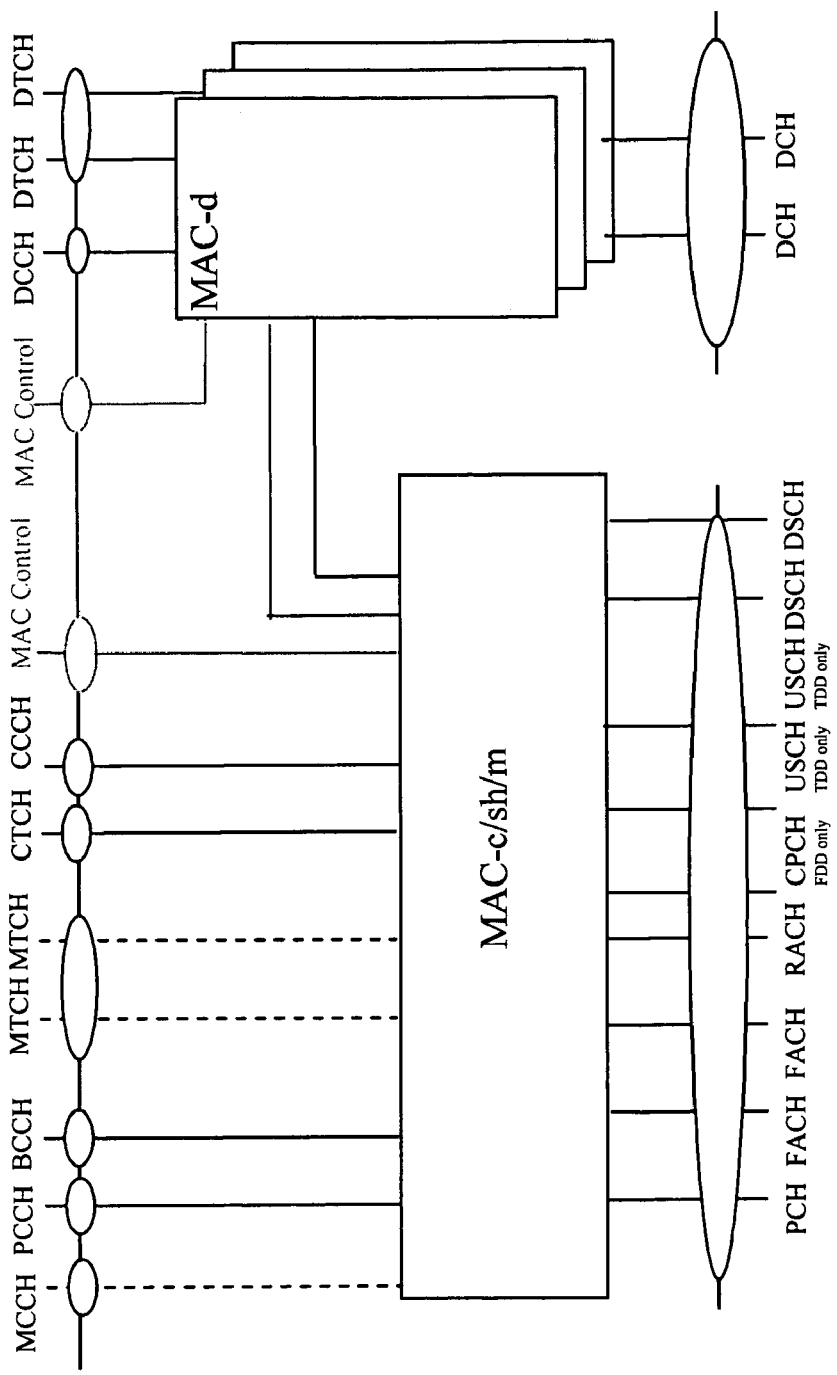
FIG. 4 illustrates a related art structure of MAC layers for a terminal and a network providing a point-to-multipoint service.
Figure 5:
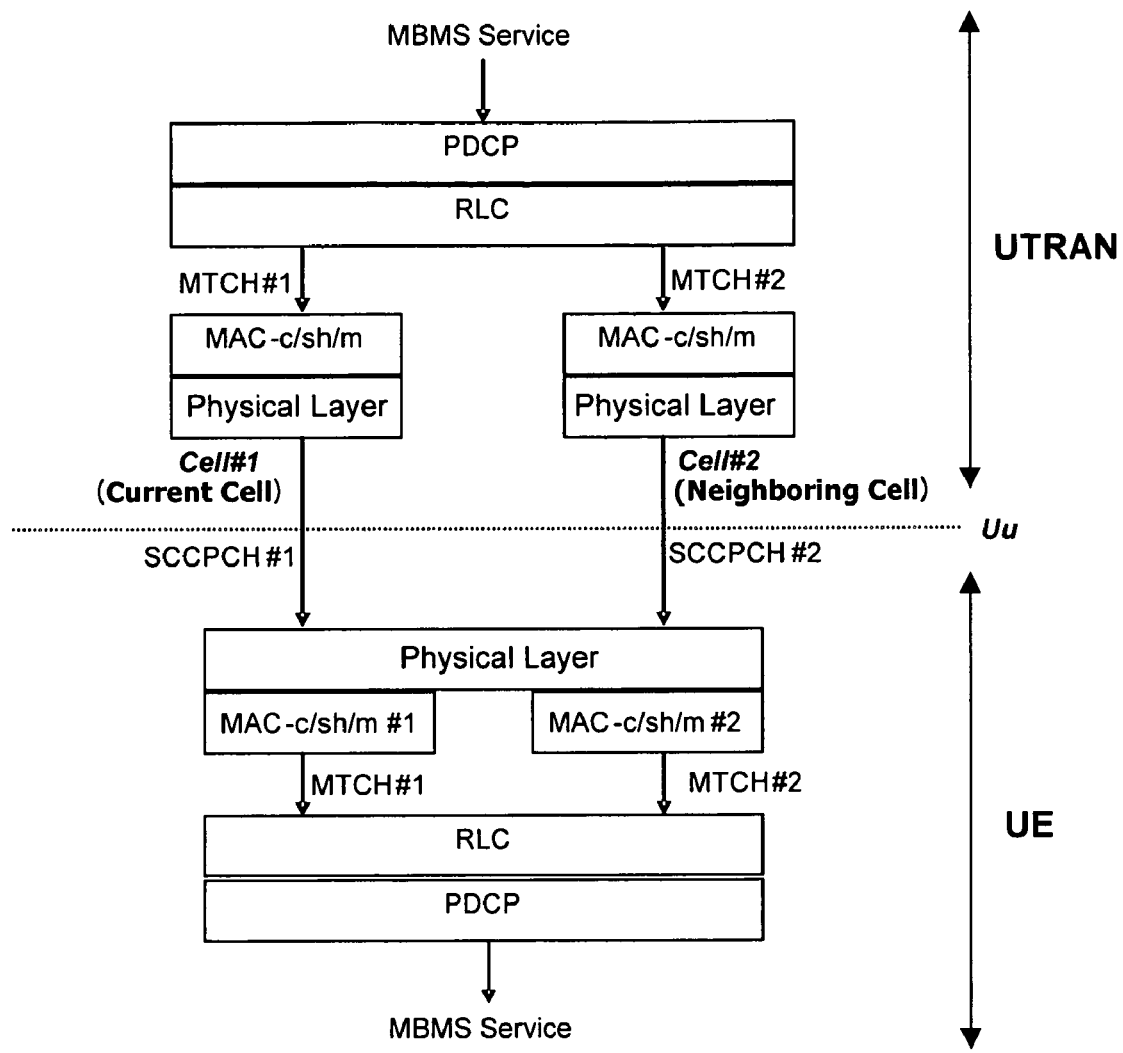
FIG. 5 illustrates a radio protocol architecture in accordance with a related art selective combining method for a point-to-multipoint service.

The present invention relates to an apparatus and method for combining point-to-multipoint service data in a receiving side of a wireless communication system.

In accordance with a preferred embodiment of the present invention, a MAC (Media Access Control) layer of a receiving side, such as a mobile terminal, comprises a MAC entity. The MAC entity receives an MBMS for a specific cell to check whether data received from a neighboring (adjacent) cell is related to the MBMS. If the received data is not related to the MBMS, the MAC entity discards the received non-MBMS data.

Preferably, the MAC layer of the terminal includes one MAC entity per cell. An RRC of the terminal indicates whether a MAC entity of the terminal is related to a current cell or a neighboring cell. If the RRC of the terminal indicates that a specific MAC entity is related to the neighboring cell, and the specific MAC entity receives data not related to the MBMS, the received non-MBMS data is discarded.

In accordance with a preferred embodiment of the present invention, for a MAC entity receiving a common channel of the current cell, a terminal for receiving the MBMS separately includes a MAC entity for managing a common channel for the MBMS and a MAC entity for managing other common channels.

Preferably, for a terminal receiving an MBMS from a neighboring cell, a MAC entity in the terminal is provided per cell to receive a common channel of the neighboring cell. Preferably, the MAC entity of the terminal, which receives the common channel of the neighboring cell, checks whether the data received from the neighboring cell is related to the MBMS. If the data is not related to the MBMS, the received non-MBMS data is discarded.

Furthermore, an RRC of the terminal preferably indicates whether a MAC entity of the terminal is related to a current cell or a neighboring cell. If the RRC of the terminal indicates that a specific MAC entity is related to the neighboring cell and the specific MAC entity receives data not related to the MBMS, the received non-MBMS data is discarded.

In accordance with a preferred embodiment of the present invention, a terminal comprises one or more upper layer entities related to a specific physical channel at an upper portion of a physical layer. The physical layer receives data from the physical channel. The terminal interprets the received data, determines an upper layer entity for receiving the interpreted data, and transmits the interpreted data to the determined upper layer entity.

Preferably, the upper layer is a MAC layer. Furthermore, one or more upper layer entities related to one physical layer may be MAC layer entity receiving the common channel with respect to the MBMS and a MAC layer entity receiving other common channels. Preferably, the physical layer of the terminal interprets the data received from one physical channel and determines whether to deliver the received data to the MAC layer entity receiving the common channel with respect to the MBMS or to the MAC layer entity receiving other common channels. Thereafter, the physical layer of the terminal delivers the received data to the determined MAC layer entity through a corresponding transport channel connected to the determined MAC layer entity.

FIGS. 6 to 9 illustrate radio protocol architectures for MBMS selective combining methods in accordance with the preferred embodiments of the present invention. The preferred embodiments will now be described with reference to FIGS. 6 to 9.

In the present invention, a terminal preferably receives both an MBMS service and a non-MBMS service together from a UTRAN. The MBMS service involves data transmissions using a point-to-multipoint RB (Radio Bearer). The non-MBMS service involves transmitting control information such as an RRC message through a dedicated channel or a common channel, transmitting data to a specific terminal through a dedicated channel, or transmitting user data through the common channel.

As shown in the figures, the non-MBMS service is processed in an RLC#0 entity and a MAC-c/sh/m entity of the UTRAN, and transmitted from the cell #1 through the physical channel SCCPCH#1 to the terminal, wherein the cell #1 is a current cell. Preferably, the non-MBMS service is an RRC message that uses the logical channel CCCH and the transport channel FACH#0 during transmission. Alternatively, other logical channels such as DCCH, DTCH, CTCH, BCCH, PCCH, or the like may be also used to transmit the non-MBMS service depending on its type. For example, if the PCCH is used as a logical channel, the PCH would be used as a transport channel.

Referring to FIGS. 6 to 9, it is preferable that the UTRAN provide the same MBMS to the mobile terminal through cells #1 and #2. The UTRAN comprises a PDCP entity and an RLC#1 for the MBMS. The UTRAN also comprises a MAC-c/sh/m#1 for the cell #1 and a MAC-c/sh/m#2 for the cell #2. The MAC-c/sh/m#1 and MAC-c/sh/m#2 receive an RLC PDU for the MBMS from the same RLC entity (RLC#1), and the RLC PDU having MBMS is provided to the terminal through a different cell. The MBMS data is delivered through a physical channel existing for each cell.

Generally, in the MBMS selective combining method, the terminal combines the same MBMS data transferred through a plurality of MTCHs from multiple cells. For the sake of explanation, the figures of the present invention illustrate the combining of the same MBMS data transferred through two MTCHs from two cells, respectively. However, the present invention also provides for the combining of the same MBMS data transferred through more than two MTCHs from more than two cells, respectively.

Accordingly, the terminal shown in FIGS. 6 to 9 receive a specific MBMS from the cell #1 through the logical channel MTCH#1, the transport channel FACH#1 and the physical channel SCCPCH#1. The terminal also receives the same specific MBMS from the cell #2 through the logical channel MTCH#2, the transport channel FACH#2 and the physical channel SCCPCH#2. An RLC entity (RLC#1) of the terminal selectively combines the MBMS data received through the MTCH#1 and MTCH#2.

Figure 6:
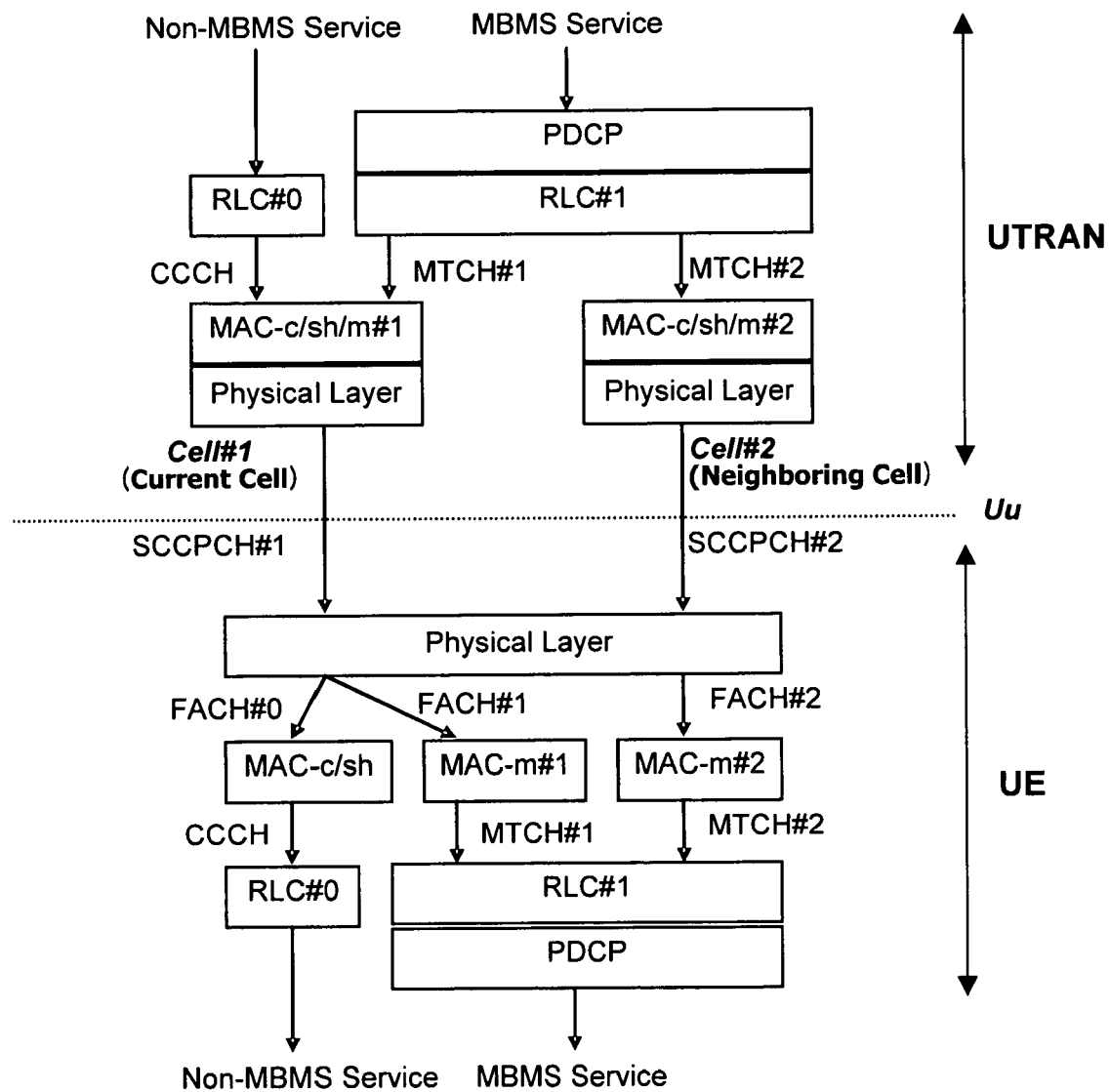
FIG. 6 illustrates a selective combining method for a point-to-multipoint service in accordance with a first embodiment of the present invention.

FIG. 6 illustrates a selective combining method for an MBMS in accordance with a first embodiment of the present invention. Referring to FIG. 6, a mobile terminal comprises both a MAC entity for common channel (MAC-c/sh) and a MAC entity for MBMS (MAC-m#1) for a current cell (cell #1). For a neighboring cell (cell#2), the mobile terminal comprises a MAC entity for MBMS (MAC-m#2). In case of receiving a MTCH from one or more neighboring cells, the terminal comprises one MAC-m entity per neighboring cell that transmits the MTCH.

Preferably, the mobile terminal comprises one MAC-c/sh entity for the current cell (cell #1) for a non-MBMS service and one MAC-m entity for each cell transmitting a specific MBMS service. In the cell #1, the MAC-c/sh entity preferably handles the reception of common channels and the MAC-m#1 entity handles the reception of the MTCH-mapped FACH. However, in general, the MTCH-mapped FACH may be handled by the MAC-c/sh entity or the MAC-m#1 entity.

When a physical layer of the mobile terminal receives data from the cell #1 through SCCPCH#1, if the data corresponds to FACH#0, the physical layer transfers the data to the MAC-c/sh entity. If the received data corresponds to FACH#1, the physical layer transfers the data to the MAC-m#1 entity. Also, when the physical layer of the terminal receives data from the cell#2 through SCCPCH#2, if the received data corresponds to FACH#2, the physical layer transfers the data to the MAC-m#2 entity.

The MAC-m#1 entity extracts data corresponding to the MTCH#1 from the FACH#1. The MAC-m#2 entity extracts data corresponding to the MTCH#2 from the FACH#2. The MAC-m#1 entity and MAC-m#2 entity transfer the received data to the RLC#1 through the MTCH#1 and MTCH#2, respectively. In the RLC#1, the data received from the MTCH#1 and the MTCH#2 are selectively combined.

Figure 7:
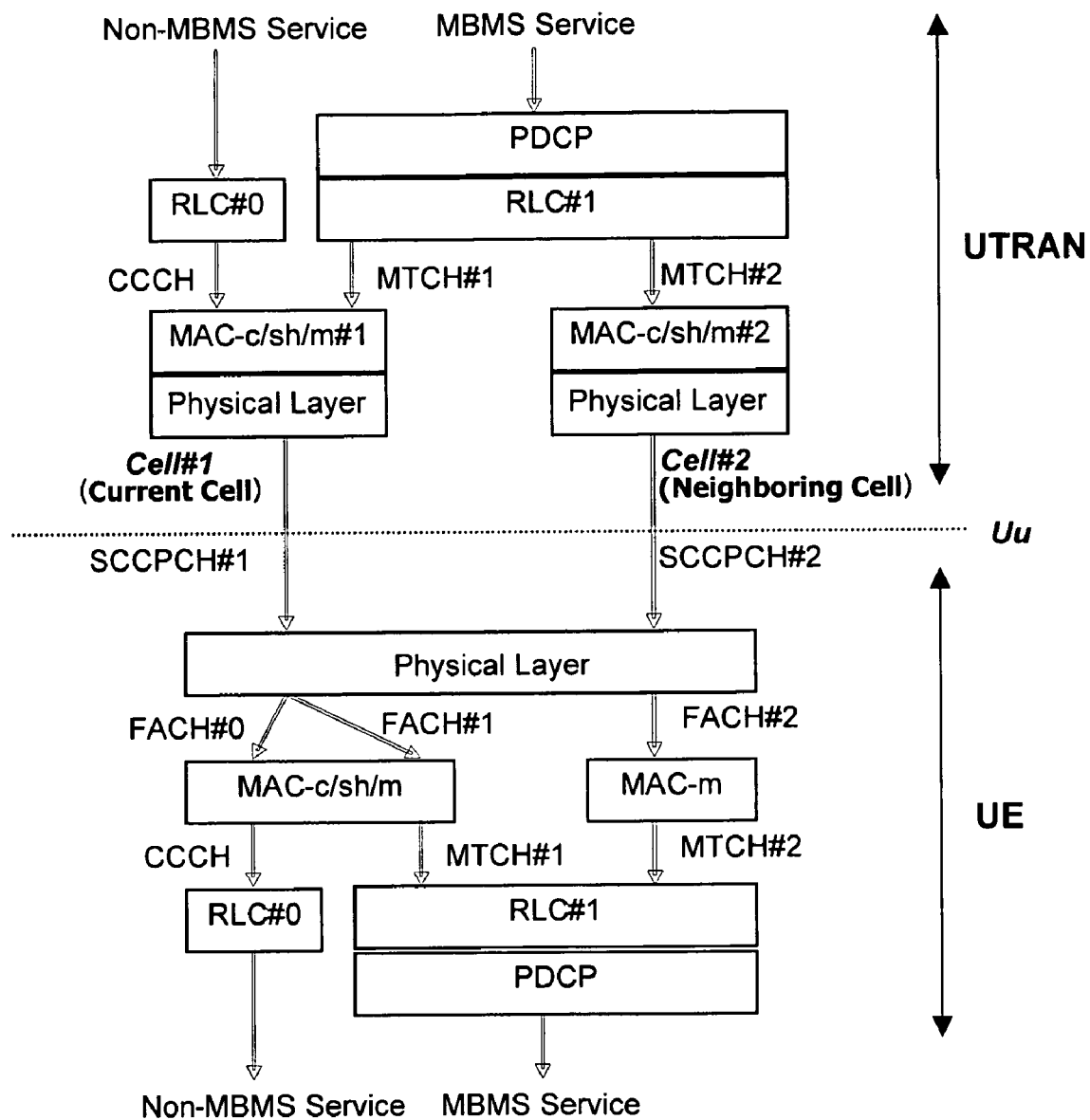
FIG. 7 illustrates a selective combining method for a point-to-multipoint service in accordance with a second embodiment of the present invention.

FIG. 7 illustrates a selective combining method for an MBMS in accordance with a second embodiment of the present invention. Referring to FIG. 7, a mobile terminal comprises one MAC-c/sh/m for handling both a common channel and an MBMS for a current cell (cell #1). The mobile terminal also comprises a MAC entity for MBMS (MAC-m) for a neighboring cell (cell #2). In case of receiving a MTCH from one or more neighboring cells, the mobile terminal includes one MAC-m entity per neighboring cell that transmits the MTCH.

Preferably, the mobile terminal comprises one MAC-c/sh/m entity for the current cell (cell #1). In the cell #1, the MAC-c/sh/m entity handles the reception of the FACH to which the MTCH is mapped, the reception of the FACH to which MCCH is mapped and the reception of the FACH to which CCCH is mapped.

When a physical layer of the mobile terminal receives data from the cell #1 through SCCPCH#1, if the data corresponds to FACH#0 or FACH#1, the physical layer transfers the data to the MAC-c/sh/m layer. Also, when the physical layer of the mobile terminal receives data from the cell #2 through SCCPCH#2, if the received data corresponds to FACH#2, the physical layer transfers the data to the MAC-m entity.

The MAC-c/sh/m entity extracts the data corresponding to MTCH#1 from the FACH#1 and the MAC-m entity extracts the data corresponding to MTCH#2 from the FACH#2. The MAC-c/sh/m entity and the MAC-m entity transfer the received data to the RLC#1 through the MTCH#1 and MTCH#2, respectively. The RLC#1 then selectively combines the data received from the MTCH#1 and MTCH#2.

Figure 8:
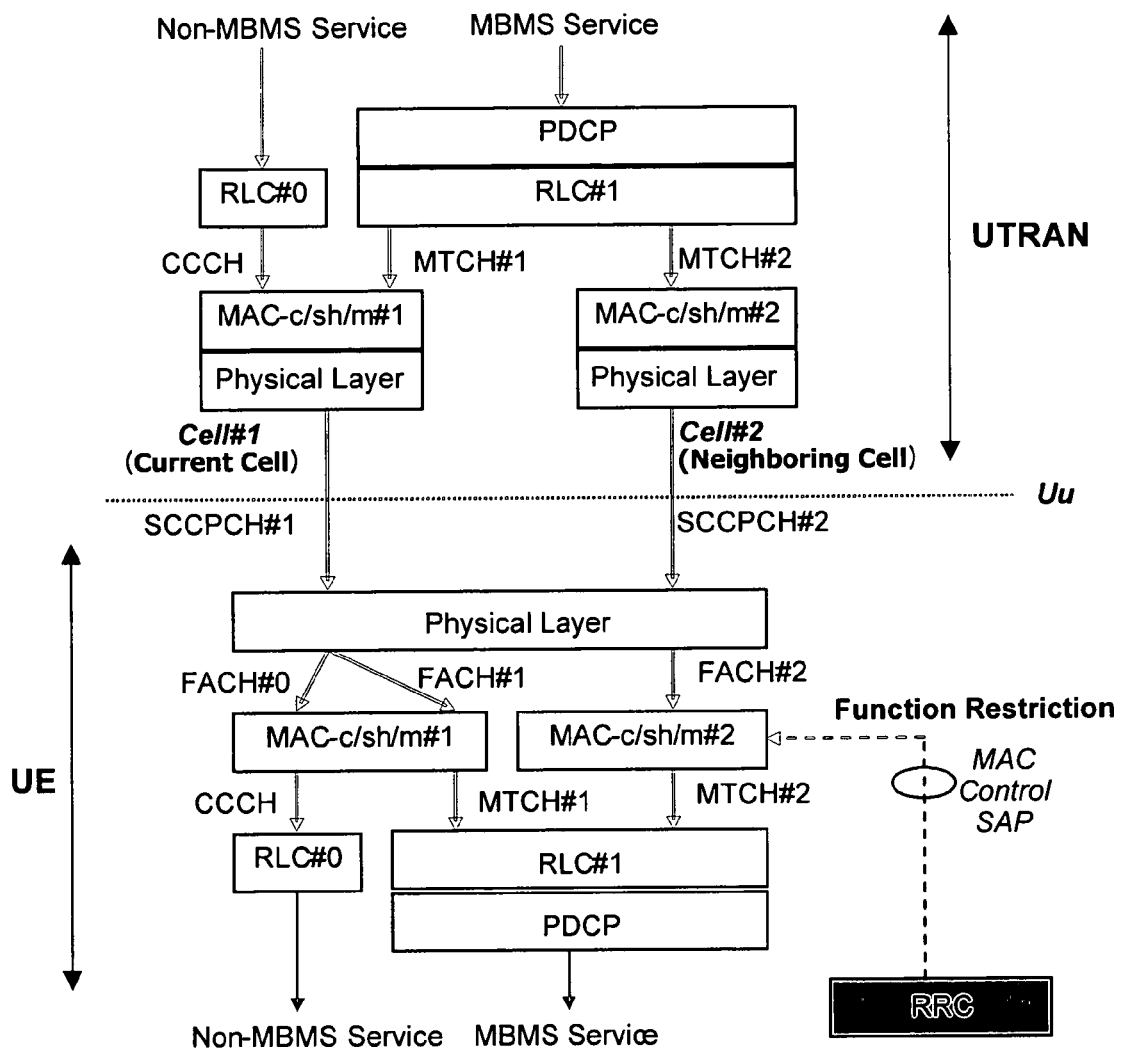
FIG. 8 illustrates a selective combining method for a point-to-multipoint service in accordance with a third embodiment of the present invention.

FIG. 8 illustrates a selective combining method for an MBMS in accordance with a third embodiment of the present invention. Referring to FIG. 8, a mobile terminal comprises one MAC-c/sh/m entity for handling both a common channel and an MBMS for a current cell (cell #1). The mobile terminal also comprises a MAC-c/sh/m entity for a neighboring cell (cell #2). In case of receiving a MTCH from one or more neighboring cells, the mobile terminal comprises one MAC-c/sh/m entity per neighboring cell that transmits the MTCH. In this embodiment, it is preferable that a function of the MAC-c/sh/m entity for the neighboring cell be limited such that the MAC-c/sh/m entity for the neighboring cell is dedicatedly used for the MBMS. Accordingly, an RRC of the mobile terminal serves to limit the function of the MAC-c/sh/m entity for the neighboring cell.

Preferably, the mobile terminal comprises one MAC-c/sh/m#1 entity for the current cell (cell #1). In the cell #1, the MAC-c/sh/m#1 entity handles the reception of the FACH to which MTCH is mapped, the reception of the FACH to which MCCH is mapped and the reception of the FACH to which CCCH is mapped.

When a physical layer of the mobile terminal receives data from the cell #1 through SCCPCH#1, if the data corresponds to FACH#0 or FACH#1, the physical layer transfers the data to the MAC-c/sh/m#1 entity. Furthermore, when the physical layer of the mobile terminal receives data from the cell #2 through SCCPCH#2, if the received data corresponds to FACH#2, the physical layer transfers the data to the MAC-c/sh/m#2 entity.

The MAC-c/sh/m#1 entity extracts data corresponding to the MTCH#1 from the FACH#1 and the MAC-c/sh/m#2 entity extracts data corresponding to the MTCH#2 from the FACH#2. The MAC-c/sh/m#1 entity and the MAC-c/sh/m#2 entity then transfer the received data to the RLC#1 through the MTCH#1 and MTCH#2, respectively. In the RLC#1, the data received from the MTCH#1 and MTCH#2 are selectively combined.

If the mobile terminal includes a plurality of MAC-c/sh/m entities, an RRC of the mobile terminal preferably transfers to the MAC-c/sh/m entity the mobile terminal information for discriminating between the MAC-c/sh/m#1 entity of the current cell and the MAC-c/sh/m#2 entity of the neighboring cell. The discrimination information is transferred using a primitive, which passes through a MAC control SAP. In addition, the RRC of the mobile terminal transfers a command to the MAC-c/sh/m#2 entity of the mobile terminal for limiting the function of the MAC-c/sh/m#2 entity. Preferably, the function of MAC-c/sh/m#2 entity is limited to "MICH reception" or "MTCH/MCCH reception" by using the primitive, which passes through the MAC control SAP.

When the MAC-c/sh/m entity, namely, the MAC-c/sh/m#2 entity, for the neighboring cell receives the limitation command, it receives only the MTCH. Thus, when logical channels other than the MTCH are mapped to a transport channel, which has been received from the neighboring cell, if the received data does not correspond to the MTCH, the MAC-c/sh/m#2 entity discards the received data.

Preferably, the MAC-c/sh/m#2 entity may receive the MCCH of the cell #2 together with the MTCH. Accordingly, if the received data does not correspond to the MTCH and does not correspond to the MCCH, the MAC-c/sh/m#2 layer discards the received data.

Figure 9:
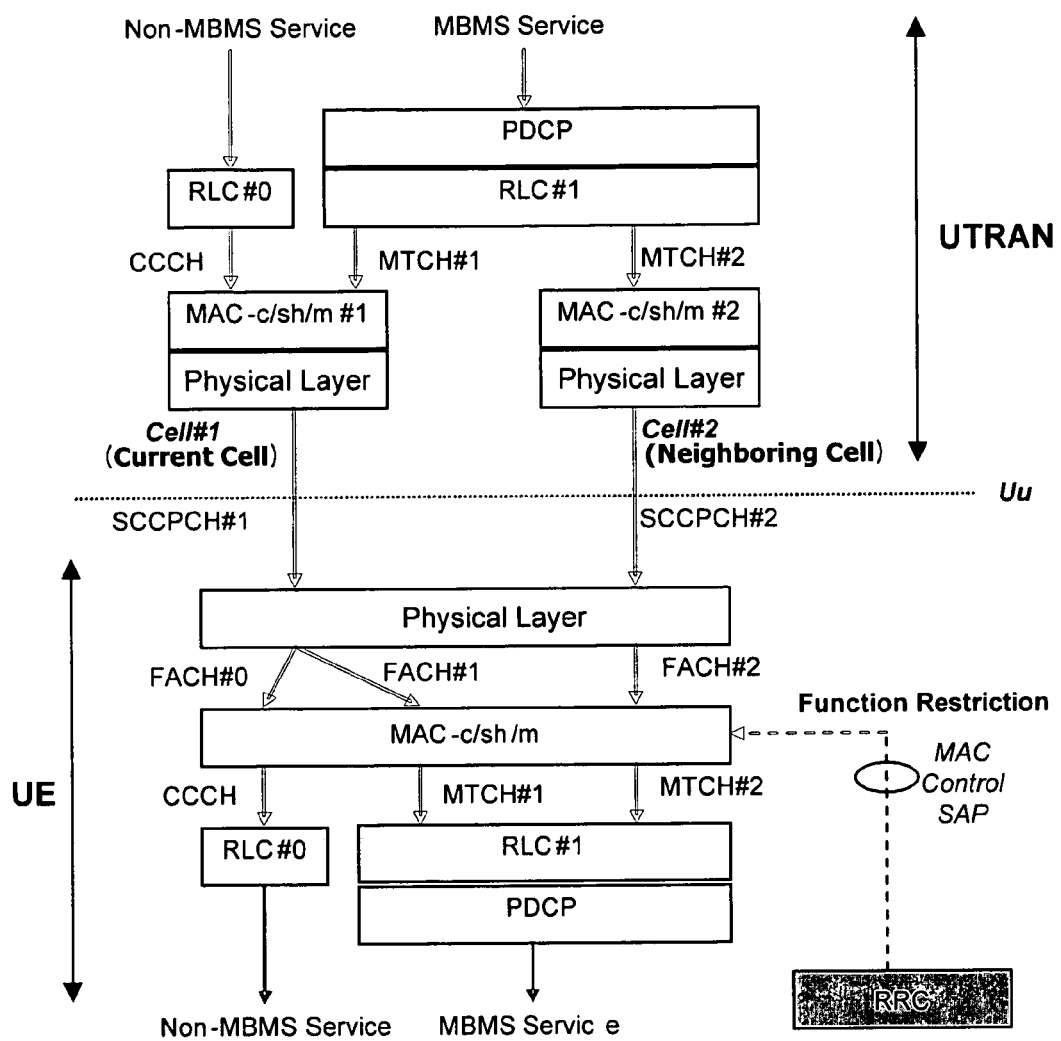
FIG. 9 illustrates a selective combining method for a point-to-multipoint service in accordance with a fourth embodiment of the present invention.

FIG. 9 illustrates a selective combining method for an MBMS in accordance with a fourth embodiment of the present invention. Referring to FIG. 9, a mobile terminal comprises one MAC-c/sh/m entity for handling both a common channel for non-MBMS and a common channel for MBMS. The MAC-c/sh/m entity is commonly used for a current cell (cell #1) and a neighboring cell (cell #2). A function of the MAC-c/sh/m entity may be limited such that it is exclusively used for the MBMS with respect to receiving a channel of the neighboring cell. Accordingly, an RRC of the mobile terminal serves to limit the function of the MAC-c/sh/m entity.

Preferably, the mobile terminal comprises one MAC-c/sh/m entity regardless of the number of cells. For the cell #1, the MAC-c/sh/m entity handles the reception of the FACH to which MTCH is mapped, the reception of the FACH to which MCCH is mapped, and the other remaining common channels.

When a physical layer of the mobile terminal receives data from the cell #1 through SCCPCH#1, if the data corresponds to FACH#0 or FACH#1, the physical layer transfers the data to the MAC-c/sh/m entity. Moreover, when the physical layer of the mobile terminal receives data from the cell #2 through SCCPCH#2, if the received data corresponds to FACH#2, the physical layer also transfers the data to the MAC-c/sh/m entity.

The MAC-c/sh/m entity extracts data corresponding to MTCH#1 from the FACH#1 and data corresponding to the MTCH#2 from the FACH#2. The MAC-c/sh/m entity transfers the received data to the RLC#1 through the MTCH#1 and MTCH#2 for the same MBMS. The RLC#1 then selectively combines the data received from the MTCH#1 and MTCH#2.

An RRC of the mobile terminal transfers a command to the MAC-c/sh/m entity of the mobile terminal for limiting a function of the MAC-c/sh/m entity with respect to the neighboring cell. Preferably, the MAC-c/sh/m function of the mobile terminal with respect to the neighboring cell is limited to "MTCH reception" or "MTCH/MCCH reception". The function is limited by using a primitive, which passes through a MAC control SAP.

When the MAC-c/sh/m entity receives the limitation command, it receives only the MTCH with respect to the neighboring cell. Thus, when a logical channel other than the MTCH is mapped to a transport channel, which has been received from the neighboring cell, if data received does not correspond to the MTCH, the MAC-c/sh/m entity discards the received data.

Preferably, the MAC-c/sh/m entity may receive the MCCH together with the MTCH with respect to the neighboring cell. Accordingly, if the received data does not correspond to the MTCH and does not correspond to the MCCH, the MAC-c/sh/m entity discards the received data.

Figure 10:
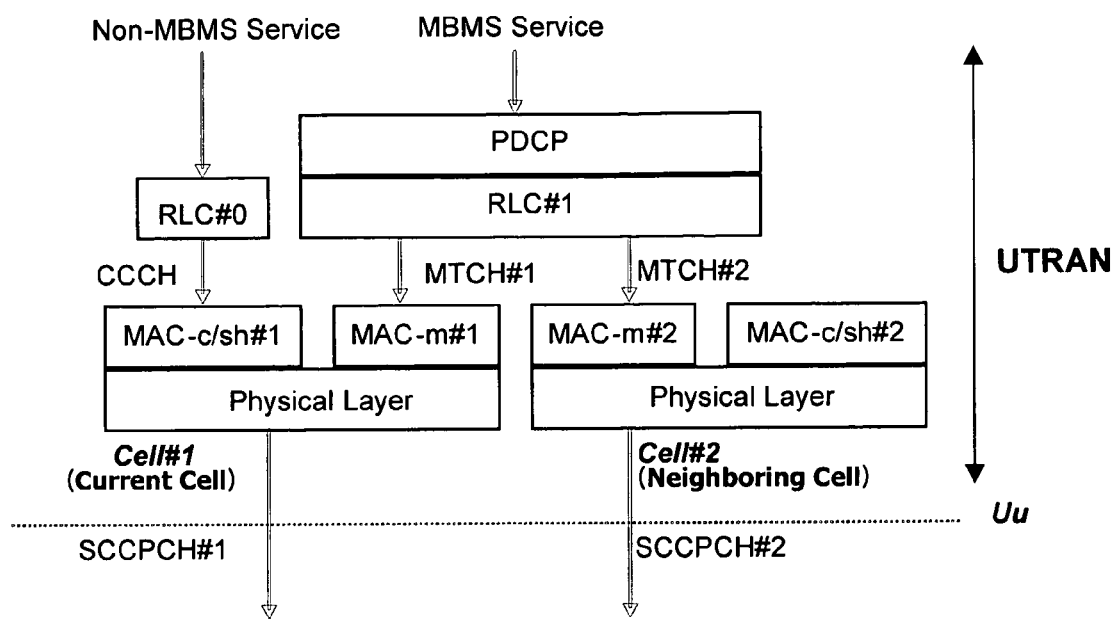
FIG. 10 illustrates a radio protocol architecture of a network in accordance with a preferred embodiment of the present invention.

FIG. 10 illustrates a radio protocol architecture of a network in accordance with a preferred embodiment of the present invention. Preferably, the architecture is applied to the UTRAN and may be applied to all UTRANs in accordance with the preferred embodiments of the present invention.

Referring to FIG. 10, a MAC-c/sh#1 entity handles a common channel of a cell #1 except for an MBMS in an RNC, and a MAC-m#1 entity handles a MTCH of the cell #1 in the RNC. A MAC-c/sh#2 entity handles a common channel of a cell #2 except for an MBMS in the RNC, and a MAC-m#2 entity handles a MTCH of the cell #2 in the RNC. In each cell, an MCCH may be handled by a MAC-c/sh entity or a MAC-m entity.

Figure 11:
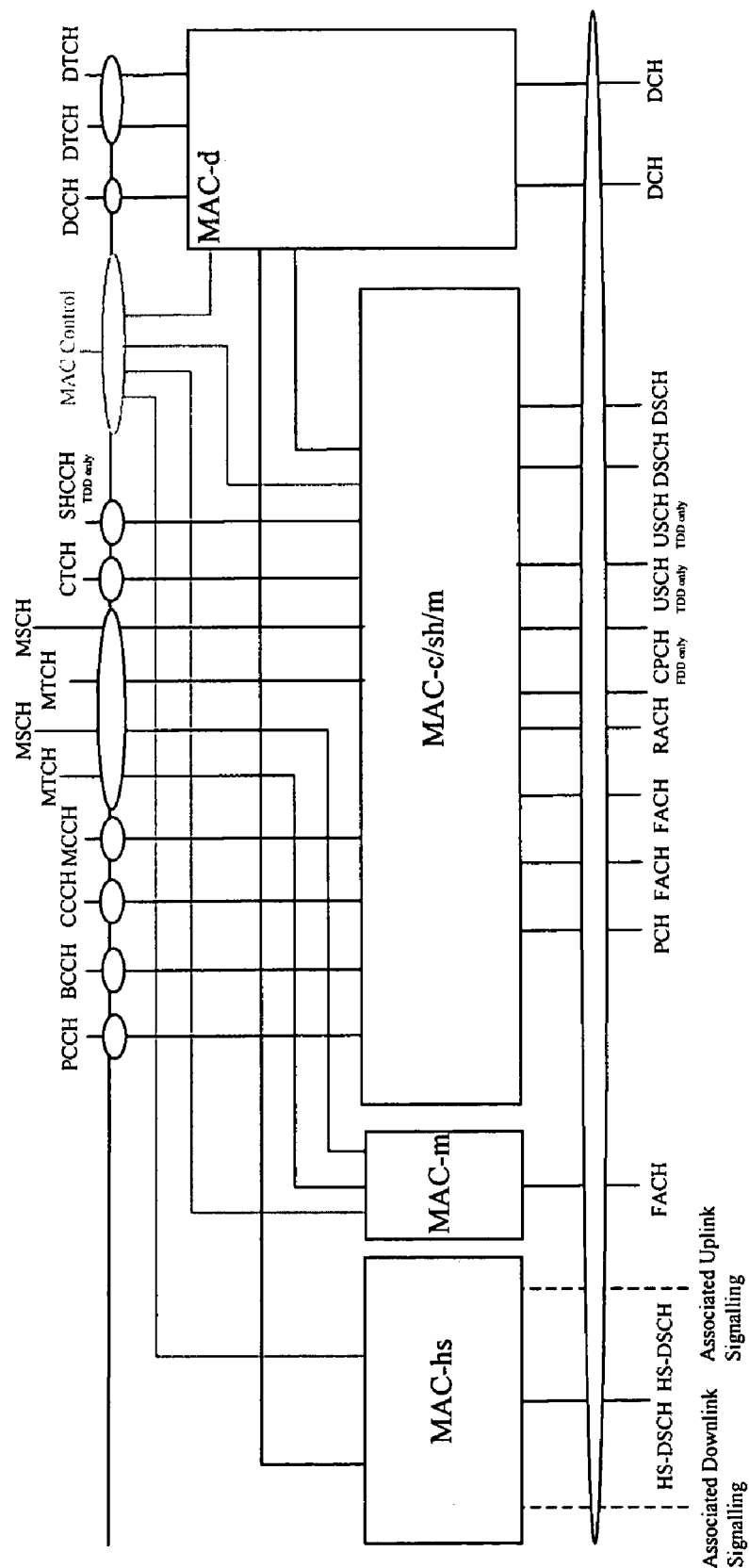
FIG. 11 illustrates the connectivity of MAC entities in accordance with a preferred embodiment of the present invention.

FIG. 11 illustrates the connectivity of MAC entities in accordance with a preferred embodiment of the present invention. Referring to FIG. 11, a MAC-c/sh/m entity controls access to all common transport channels, except a High-Speed Downlink Shared Channel (HS-DSCH) transport channel. A MAC-d entity controls access to all dedicated transport channels, to MAC-c/sh/m entity and MAC-hs entity. The MAC-hs entity controls access to the HS-DSCH transport channel. A MAC Control SAP is used to transfer control information to each MAC entity.

Preferably, when MTCH channels from multiple cells are selectively combined, a MAC-m entity controls access to FACH transport channels used to carry MTCH and MSCH. In the downlink, if dedicated logical channels are mapped to common transport channels, then the MAC-d entity receives data from the MAC-c/sh/m entity or MAC-hs entity. In the uplink, if dedicated logical channels are mapped to common transport channels, then the MAC-d entity transmits data to the MAC-c/sh/m entity.

As described above, the MAC-c/sh/m entity is operatively connected with the MAC-d entity and supports both an uplink channel and a downlink channel. In contrast, the MAC-m entity is not operatively connected with the MAC-d entity and only supports a downlink channel. Moreover, the MAC-c/sh/m entity is capable of processing a mobile terminal identifier (UE ID); however, the MAC-m entity is not.

Figure 12:
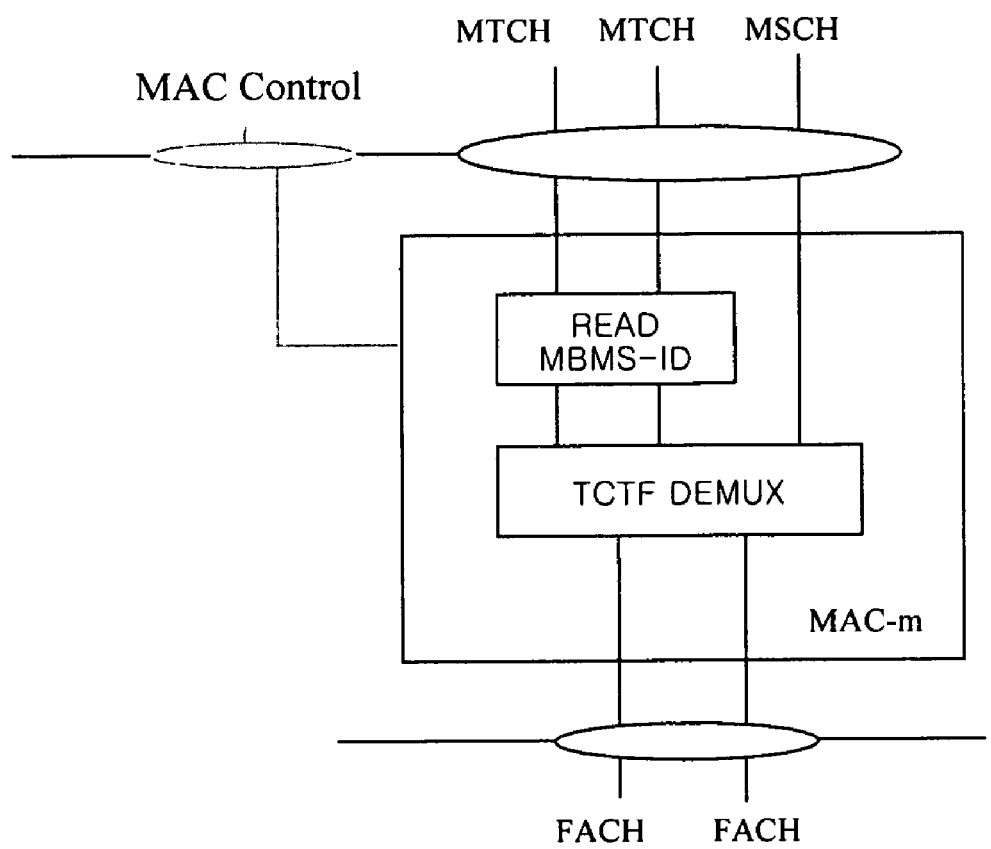
FIG. 12 illustrates a MAC-m entity with respect to a mobile terminal in accordance with a preferred embodiment of the present invention.

FIG. 12 illustrates a MAC-m entity with respect to a mobile terminal in accordance with a preferred embodiment of the present invention. Referring to FIG. 12, the MAC-m entity comprises a Target Channel Type Field DEMUX (TCTF DEMUX) for handling a TCTF field in a MAC header. Preferably, the TCTF DEMUX handles detection and deletion functions for downlink channels of the TCTF field. The TCTF DEMUX also represents the respective mapping between logical channels and transport channels. The TCTF field indicates a common logical channel type.

In case of MTCH reception, the MAC-m entity reads an MBMS ID. The MBMS ID identifies received data to an MBMS service. A MAC Control SAP is used to transfer control information to the MAC-m entity. Preferably, if MTCH channels are selectively combined, the MAC-m entity exists in the mobile terminal. Otherwise, the MAC-m entity does not exist. Moreover, in case MTCH channels are selectively combined from multiple cells, there is one MAC-ch/sh/m entity for a current cell and one MAC-m entity for each neighboring cell in the mobile terminal.

As so far described, the method for receiving an MBMS of the present invention has the following advantages. When the MAC layer of the terminal receives MBMS data from a plurality of neighboring cells, it discards non-MBMS data received from the neighboring cells. Thus, an unnecessary operation of the mobile terminal in simultaneously receiving MBMS data from different cells is eliminated. Therefore, the mobile terminal may effectively receive MBMS services.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for combining point-to-multipoint service data in a mobile terminal of a wireless communication system, the method comprising:
   receiving and processing point-to-multipoint service data of a current cell in a first medium access control entity capable of supporting a point-to-multipoint service and capable of processing a common channel and a shared channel;
   receiving and processing the same point-to-multipoint service data from a neighboring cell in a second medium access control entity capable of only supporting the point-to-multipoint service, wherein only one second medium access control entity exists for the neighboring cell;
   providing the processed point-to-multipoint service data of the current cell from the first medium access control entity to a radio link controller;
   providing the processed point-to-multipoint service data of the neighboring cell from the second medium access control entity to the radio link controller; and
   combining the processed point-to-multipoint service data of the current cell and the processed point-to-multipoint service data of the neighboring cell in the radio link controller,
   wherein:
   the first medium access control entity is operatively connected with a third medium access control entity capable of processing a dedicated channel;
   the second medium access control entity is not operatively connected with the third medium access control entity; and
   the first medium access control entity is a MAC-c/sh/m entity, the second medium access control entity is a MAC-m entity, and the third medium access control entity is a MAC-d entity.

2. The method of claim 1, wherein the point-to-multipoint service data from the neighboring cell is transmitted from a medium access control entity of a network, capable of supporting the point-to-multipoint service and capable of processing a network common channel and a network shared channel, to the second medium access control entity of the mobile terminal capable of only supporting the point-to-multipoint service.

3. The method of claim 1, wherein the first medium access control entity is capable of supporting an uplink channel and a downlink channel.

4. The method of claim 1, wherein the first medium access control entity is capable of processing a mobile terminal ID.

5. The method of claim 1, wherein the second medium access control entity is not capable of processing a mobile terminal ID.

6. A method for combining point-to-multipoint service data in a mobile terminal of a wireless communication system, the method comprising:
   receiving and processing point-to-multipoint service data of a first cell in a first medium access control entity capable of processing a common channel and a shared channel;
   receiving and processing the point-to-multipoint service data of the first cell in a second medium access control entity capable of processing only a first point-to-multipoint channel;
   receiving and processing the same point-to-multipoint service data from a second cell in a third medium access control entity capable of processing only a second point-to-multipoint channel;
   providing the processed service data of the first cell from the first medium access control entity to a first radio link controller;
   providing the processed point-to-multipoint service data of the first cell from the second medium access control entity to a second radio link controller;
   providing the processed point-to-multipoint service data of the second cell from the third medium access control entity to the second radio link controller; and
   combining the processed point-to-multipoint service data of the first cell and the processed point-to-multipoint service data of the second cell in the second radio link controller,
   wherein:
   the first medium access control entity is operatively connected with a fourth medium access control entity capable of processing a dedicated channel;
   the second medium access control entity and the third medium access control entity are not operatively connected with the fourth medium access control entity; and the first medium access control entity is a MAC-c/sh entity, the second medium access control entity is a MAC-m entity, the third medium access control entity is a MAC-m entity, and the fourth medium access control entity is a MAC-d.

7. The method of claim 6, wherein the point-to-multipoint service data from the second cell is transmitted from a medium access control entity of a network, capable of processing the second point-to-multipoint channel and a network common channel and a network shared channel, to the third medium access control entity of the mobile terminal capable of processing only the second point-to-multipoint channel.

8. The method of claim 6, wherein the first medium access control entity is capable of supporting an uplink channel and a downlink channel.

9. The method of claim 6, wherein the second medium access control entity and the third medium access control entity are capable of supporting a downlink channel.

10. The method of claim 6, wherein the first medium access control entity is capable of processing a mobile terminal ID.

11. The method of claim 6, wherein the second medium access control entity and the third medium access control entity are not capable of processing a mobile terminal ID.

12. The method of claim 1, wherein the radio link controller is a radio link control entity in a radio link control layer.

13. The method of claim 1, wherein the processed point-to-multipoint service data of the current cell is provided to the radio link controller on a first MTCH (MBMS Traffic Channel) channel.

14. The method of claim 13, wherein the processed point-to-multipoint service data of the neighboring cell is provided to the radio link controller on a second MTCH (MBMS Traffic Channel) channel.

15. The method of claim 14, wherein the first and second MTCH channels are combined to perform the combining step.

16. The method of claim 6, wherein the first point-to-multipoint channel is a first MTCH (MBMS Traffic Channel) channel and the second point-to-multipoint channel is a second MTCH (MBMS Traffic Channel) channel.

17. A mobile terminal for combining point-to-multipoint service data of a wireless communication system, the mobile terminal comprising:
  a first medium access control (MAC) entity adapted to receive and process point-to-multipoint service data of a current cell, wherein the first MAC entity is capable to support a point-to-multipoint service and capable to process a common channel and a shared channel;
  a second medium access control (MAC) entity adapted to receive and process the same point-to-multipoint service data from a neighboring cell, wherein the second MAC entity is capable to only support the point-to-multipoint service, and only one second MAC entity exists for the neighboring cell; and
  a radio link controller (RLC) entity adapted to receive the processed point-to-multipoint service data of the current cell from the first MAC entity and the processed point-to-multipoint service data of the neighboring cell from the second MAC entity, and to combine the processed point-to-multipoint service data of the current cell and the processed point-to-multipoint service data of the neighboring cell,
  wherein:
  the first MAC entity is operatively connected with a third medium access control entity capable of processing a dedicated channel;
  the second MAC entity is not operatively connected with the third medium access (MAC) entity capable of processing a dedicated channel; and
  the first MAC entity is a MAC-c/sh/m entity, the second MAC entity is a MAC-m entity, and the third MAC entity is a MAC-d entity.

18. A mobile terminal for combining point-to-multipoint service data of a wireless communication system, the mobile terminal comprising:
  a first medium access control (MAC) entity is adapted to receive and process point-to-multipoint service data of a first cell, wherein the first MAC entity is capable to process a common channel and a shared channel;
  a second medium access control (MAC) entity is adapted to receive and process point-to-multipoint service data of the first cell, wherein the second MAC entity is capable to process only a first point-to-multipoint channel;
  a third medium access control (MAC) entity is adapted to receive and process the same point-to-multipoint service data from a second cell, wherein the third MAC entity is capable to process only a second point-to-multipoint channel;
  a first radio link controller (RLC) entity is adapted to receive the processed service data of the first cell from the first MAC entity; and
  a second radio link controller (RLC) entity is adapted to receive the processed point-to-multipoint service data of the first cell from the second MAC entity and the processed point-to-multipoint service data of the second cell from the third MAC entity, and to combine the processed point-to-multipoint service data of the first cell and the processed point-to-multipoint service data of the second cell,
  wherein:
  the first MAC entity is operatively connected with a fourth medium access control (MAC) entity capable of processing a dedicated channel;
  the second MAC entity and the third MAC entity are not operatively connected with the fourth MAC entity; and
  the first MAC entity is a MAC-c/sh entity, the second MAC entity is a MAC-m entity, the third MAC entity is a MAC-m entity, and the fourth MAC entity is a MAC-d.

* * * * *